(12) United States Patent
Ishikawa et al.

(10) Patent No.: US 6,619,847 B1
(45) Date of Patent: Sep. 16, 2003

(54) CERAMIC DYNAMIC-PRESSURE BEARING, MOTOR HAVING BEARING, HARD DISK DRIVE, AND POLYGON SCANNER

(75) Inventors: Hironobu Ishikawa, Aichi (JP); Tetsuji Yogo, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 26 days.

(21) Appl. No.: 10/073,146

(22) Filed: Feb. 13, 2002

(30) Foreign Application Priority Data

Feb. 13, 2001 (JP) ........................................ 2001-035484

(51) Int. Cl.[7] ................................................. F16C 32/06
(52) U.S. Cl. ..................................... 384/100; 384/907.1
(58) Field of Search ................................. 384/100, 107, 384/114, 121, 907.1, 910, 279

(56) References Cited

U.S. PATENT DOCUMENTS

| | | | | |
|---|---|---|---|---|
| 5,127,744 A | * | 7/1992 | White et al. ................ | 384/107 |
| 5,538,649 A | * | 7/1996 | Demendi et al. ............ | 508/101 |
| 5,792,717 A | * | 8/1998 | Takayama ................... | 384/907.1 |
| 6,315,454 B1 | * | 11/2001 | Niwa .......................... | 384/492 |
| 6,417,590 B1 | * | 7/2002 | Komura et al. ............. | 384/107 |

FOREIGN PATENT DOCUMENTS

JP 11-159524 6/1996

* cited by examiner

*Primary Examiner*—Thomas R. Hannon
(74) *Attorney, Agent, or Firm*—Sughrue Mion, PLLC

(57) ABSTRACT

A ceramic dynamic-pressure bearing which is not prone to wear or a like problem associated with starting, stopping, or a like operation mode and which can realize smooth rotation. A dynamic-pressure gap 17 is formed between a first member 14 and a second member 15, which undergo relative rotation about a predetermined axis of rotation. The relative rotation of the first member 14 and the second member 15 generate fluid dynamic-pressure in the dynamic-pressure gap 17. At least a portion of one or both of the first member 14 and the second member 15 includes a polished surface (a dynamic-pressure gap definition surface) formed of alumina ceramic facing the dynamic-pressure gap 17, and the alumina ceramic, which forms the dynamic-pressure gap definition surface finished by polishing, is adjusted to have an apparent density of 3.5–3.9 g/cm$^3$. Also disclosed is a motor, hard disk drive and polygon scanner containing the bearing.

23 Claims, 9 Drawing Sheets

CERAMIC DYNAMIC-PRESSURE BEARING $$d = \frac{dmax + dmin}{2}$$

CERAMIC DYNAMIC-PRESSURE BEARING, MOTOR HAVING BEARING, HARD DISK DRIVE, AND POLYGON SCANNER

BACKGROUND OF THE INVENTION

1. Field of the Invention

The present invention relates to a ceramic dynamic-pressure bearing, a motor having a bearing, a hard disk drive, and a polygon scanner.

2. Description of the Related Art

Conventionally, a ball bearing has often been used as a bearing for the shaft of a motor serving as a drive unit of electric equipment. High-speed rotation of a motor has been rapidly implemented in precision equipment, such as peripheral equipment of a computer. In this connection, in order to obtain excellent bearing performance with low rotation-speed fluctuation and reduced noise and vibration, or in order to elongate bearing service life, a dynamic-pressure bearing, which uses fluid, such as air, as a medium, has been employed. The dynamic-pressure bearing operates in the following manner: when, for example, a spindle and a bearing member disposed so as to surround the spindle undergo relative rotation about an axis, the axis of rotation is supported by the action of fluid dynamic-pressure generated in the gap formed between the outer circumferential surface of the spindle and the inner circumferential surface of the bearing member. Also, another bearing is configured such that the thrust face of a spindle or that of a bearing member is supported by action of dynamic pressure.

When a dynamic-pressure bearing is in a high-speed rotation state, in which generated dynamic-pressure is sufficiently high, two members which face each other with a dynamic-pressure gap present therebetween do not come into contact with each other. However, at the time of starting or stopping, when rotational speed is low, sufficiently high dynamic pressure is not generated; thus, the two members come into contact with each other. Component members of such a dynamic-pressure bearing have generally been formed of a metal, such as stainless steel, and in some cases have been further coated with resin or a like material. However, the two metallic members are subject to a problem of wear or seize-up caused by mutual contact thereof at the time of starting or stopping. In order to prevent this problem, coating a metallic member with a lubricating layer, such as a resin layer, at a portion facing the dynamic-pressure gap has been attempted, resulting in failure to yield a sufficient effect. In order to attain sufficient endurance against wear and seize-up, either or both of the two members, such as either or both of the spindle and the bearing member described above, which face each other with a dynamic-pressure gap present therebetween have been formed of a ceramic, such as alumina.

3. Problems to be Solved by the Invention

However, conventionally, when a dynamic-pressure component is formed of alumina ceramic, material design cannot be said to have sufficiently considered wear or a like problem associated with starting, stopping, or a like operation mode. Also, even when a component of a dynamic-pressure bearing is formed of ceramic, a problem may arise such that vibration occurs during rotation of a spindle, thereby hindering smooth rotation of the spindle. In a dynamic-pressure bearing configured so as to support a thrust face by the action of dynamic pressure, such as a dynamic-pressure bearing configured such that a thrust face of a rotation body faces a disk-like thrust plate, when the rotation body and the thrust plate come into contact with each other at the time of starting or stopping, wear or linking (a phenomenon in which two members come into close contact due to vacuum created in the clearance therebetween) may arise.

SUMMARY OF THE INVENTION

It is therefore an object of the present invention to provide a ceramic dynamic-pressure bearing which is not prone to wear or a like problem associated with starting, stopping, or a like operation mode and which can realize smooth rotation.

The above object of the invention has been achieved by providing a ceramic dynamic-pressure bearing having a dynamic-pressure gap formed between a first member and a second member. The first and second members undergo relative rotation about a predetermined axis of rotation to generate fluid dynamic-pressure in the dynamic-pressure gap. At least a portion of one or both of the first member and the second member including a dynamic-pressure gap definition surface formed of alumina ceramic and comprising a polished surface facing the dynamic-pressure gap. Furthermore, the alumina ceramic, which forms the dynamic-pressure gap definition surface finished by polishing, has an apparent density of 3.5–3.9 g/cm$^3$.

The present invention uses alumina ceramic. Alumina is relatively inexpensive and exhibits high strength and excellent chemical stability. In the present invention, the density of the alumina ceramic is adjusted to a relatively high value of 3.5–3.9 g/cm$^3$, thereby improving the absolute value of strength and wear resistance of the alumina ceramic. The material is used to form the dynamic-pressure gap definition surface, thereby effectively preventing occurrence of wear and seize-up of the dynamic-pressure gap definition surface at the time of starting and stopping when the two members are prone to come into contact with each other.

An ideally densified alumina ceramic has a density of up to 4.0 g/cm$^3$. However, the present invention particularly employs a slightly lower density of 3.9 g/cm$^3$ as the upper limit of apparent density, for the following reason. When alumina ceramic is used as material for a dynamic-pressure bearing, the surface state of the dynamic-pressure gap definition surface of the ceramic component serving as a spindle or a bearing is important. That is, in general, fine pores are present on the surface of the ceramic component that has been subjected to polishing, and the size of such pores is considered to exert considerable influence on the state of rotation of the dynamic-pressure bearing.

Studies carried out by the present inventors have revealed that an extremely smooth dynamic-pressure gap definition surface fails to generate sufficient fluid dynamic-pressure in a dynamic-pressure gap. Insufficient dynamic pressure fails to stably support the axis of rotation, resulting in difficulty in establishing a favorable state of rotation of a dynamic-pressure bearing. Accordingly, formation of surface pores of a certain dimensional range on the dynamic-pressure gap definition surface is effective for maintaining high fluid dynamic-pressure that is generated stably at a high level.

Specifically, when pores of large size are present on the dynamic-pressure gap definition surface of the ceramic component, turbulence is generated in the fluid layer present between the spindle and the bearing upon rotation of, for example, the spindle, with the result that vibration of the spindle occurs. By contrast, when pores of small size are present on the dynamic-pressure gap definition surface of the ceramic component, adhesion easily occurs between the dynamic-pressure gap definition surfaces of the spindle and the bearing, with the result that, for example, an attempt to forcibly induce rotation in a high-friction state associated with adhesion is likely to cause occurrence of wear (hereinafter referred to as "adhesion wear") or a like problem. When one of two members between which a dynamic-pressure gap is formed is formed of metal; for example, when the spindle is formed of a metal, seize-up may occur. Also, surface pores of excessively small size hardly contribute to generation of dynamic pressure.

The above-mentioned pores are formed on the dynamic-pressure gap definition surface mainly as a result of dropping off of grains in the course of polishing. Thus, the size (diameter) or distribution of crystal grains of alumina ceramic on the dynamic-pressure gap definition surface plays a very important role in forming surface pores in a favorable state against occurrence of the above-described problems. For example, when alumina ceramic is to be sintered for complete densification, sintering must be performed at high temperature, with the result that the growth of crystal grains becomes unavoidable. In such a case, dropping off of grains becomes unlikely in the course of polishing, resulting in an insufficient amount of formed surface pores, and consequently wear adhesion or a like problem is likely to occur at the time of starting or stopping. Also, dropping off of a grown crystal grain results in formation of an excessively large surface pore, resulting in difficulty in maintaining stable rotation. However, when the upper limit of apparent density of the alumina ceramic is set to about 3.9 g/cm$^3$, the sintering temperature does not need to be increased much, thereby improving the state of formation of surface pores by restraining the growth of crystal grains. As a result, employing an alumina ceramic of relatively high density yields a combined effect of enhancing the absolute value of strength and wear resistance and effectively solves the problem of wear on the dynamic-pressure gap definition surface or the problem of linking. An apparent density of less than 3.5 g/cm3 impairs strength and wear resistance of alumina ceramic, with the result that the dynamic-pressure gap definition surface becomes likely to suffer wear at the time of starting or stopping. More preferably, the apparent density of the alumina ceramic is adjusted to 3.6–3.9 g/cm$^3$.

The apparent density of the alumina ceramic is not only influenced by the condition of densification, but, to some extent, is also influenced by the kind and content of a sintering aid added thereto. Relative density (i.e., a value obtained by dividing apparent density by true density estimated from the compositional ratios of alumina and a sintering aid) can be used as an index for describing the relationship between a densification level and the degree of growth of crystal grains of ceramic. In the present invention, the relative density of the alumina ceramic is 90–98%, preferably 94–98%.

An alumina ceramic adjusted to the above-described density range can assume a high bending strength of 280–550 MPa. The dynamic-pressure gap definition surface of the alumina ceramic can attain a high Rockwell hardness of 92–98 measured at a load of 15N. Enhancement of the strength of alumina ceramic to such a high level effectively prevents or restrains wear on the dynamic-pressure gap definition surface at the time of starting or stopping. Notably, bending strength herein refers to 3-point bending strength measured at room temperature according to the method specified in JIS R1601 (1981). Rockwell hardness measured at a load of 15 N refers to hardness measured at room temperature according to the method specified in JIS Z2245 (1992).

The ceramic which is used to form the dynamic-pressure gap definition surface of a member can be adjusted such that the crystal grains assume an average grain size of 1–7 µm. As a result, the size and amount of surface pores which are advantageous can be realized in terms of stable maintenance of generated fluid dynamic-pressure at a high level and effective restraint of a problem, such as adhesion wear, seize-up, linking, at the time of starting or stopping a dynamic-pressure bearing. Adjusting the ceramic crystal grains to an average grain size of 1–7 µm, which is a rather small value for alumina ceramic, enhances the mechanical strength of alumina ceramic, thereby enhancing wear resistance.

Herein, the size of a surface pore (or a crystal grain) is defined in the following manner. As shown in FIG. 6, various parallel lines circumscribe a surface pore (or crystal grain) which is observed on the microstructure of the dynamic-pressure gap definition surface by means of SEM, an optical microscope, or like equipment. The size of the surface pore is represented by an average value of the minimum distance dmin between such parallel lines and the maximum distance dmax between such parallel lines (i.e., d =(dmin +dmax)/2).

When ceramic crystal grains assume an average grain size of less than 1 µm, the average size of surface pores to be formed becomes too small, and as a result the dynamic-pressure gap definition surface is prone to adhesion wear, seize-up, or linking when the bearing starts or stops rotating. Also, since fluid dynamic-pressure to be generated in the dynamic-pressure gap tends to become insufficient, rotational runout becomes likely to occur. By contrast, when the ceramic crystal grains assume an average grain size in excess of 7 µm, the average size of surface pores to be formed becomes too large, with the result that excessive turbulence is generated in the dynamic-pressure gap, and thus the axis of rotation is likely to vibrate. More preferably, the ceramic crystal grains assume an average grain size of 2–5 µm.

In order to realize the above-mentioned advantageous size and amount of surface pores formed on the dynamic-pressure gap definition surface, ceramic crystal grains having a grain size of 2–5 µm preferably occupy an area percentage of not less than 40% (including 100%). When an area percentage occupied by ceramic crystal grains falling within the above-mentioned dimensional range is less than 40%; for example, when grains having a grain size in excess of the upper limit of the above-mentioned dimensional range increase, dropping off of grains becomes unlikely to occur, with the result that an area percentage occupied by surface pores contributing effectively to generation of dynamic pressure may become insufficient. By contrast, when grains having a grain size less than the lower limit of the above-mentioned dimensional range increase, the average size of surface pores to be formed tends to decrease. Either case may be disadvantageous in terms of generation of sufficient dynamic pressure. In view of prevention of occurrence of vibration, preferably the maximum size of surface pores present on the dynamic-pressure gap definition surface is not greater than 100 µm; i.e., surface pores having a size in excess of 100 µm should not be present.

Alumina ceramic can be made by sintering a mixture of an alumina powder and an appropriate sintering aid powder (e.g., a powder of an oxide of Mg, Ca, Si, or Na). As shown in FIG. 11, the alumina ceramic assumes a microstructure such that crystal grains, which contain a predominant amount of alumina and form a main phase, are joined together by a grain boundary phase derived from the sintering aid. Dropping off of crystal grains in the course of polishing is considered to occur mainly through fracture of the grain boundary phase. As a result of crystal grains dropping off, spaces which have been occupied by the crystal grains open on the dynamic-pressure gap definition surface to thereby become pores. Conceivably, crystal grains are likely to drop off in a portion of the grain boundary phase where the bonding force is relatively weak, such as a portion of the grain boundary phase where the thickness of the grain boundary phase is decreased, a portion of the grain boundary phase where the grain boundary phase is not present due to presence of an internal cavity or the like, or a portion of the grain boundary phase where the strength of the grain boundary phase is lacking due to, for example, the presence of a crack derived from component segregation, thermal stress, or a like cause. Notably, in the present invention, unless otherwise specified, the term "predominant" used in relation to content means that the substance in question is contained in an amount of not less than 50% by weight (the terms "predominantly" and "mainly" have the same meaning).

For example, when a single crystal grain drops off, a pore whose shape and size correspond to those of the crystal grain is formed as represented by pore $V_1$ in FIG. 12(a) (in the figure, white grains represent remaining grains, whereas black grains represent grains which have dropped off). When a plurality of crystal grains drop off, a pore as represented by $V_2$ is formed. As shown in FIG. 12(b), the microstructure of ceramic is usually such that crystal grains of various sizes are mixedly present. Thus, when a large crystal grain is surrounded by a plurality of small crystal grains, dropping off of a series of the smaller crystal grains may cause dropping off of the central large crystal grain. In these cases, a pore to be formed naturally becomes greater in size than the individual crystal grains which have dropped off.

When the microstructure of alumina ceramic is isometric; i.e., the shape anisotropy of individual crystal grains is low, and a portion of the grain boundary phase where a bonding force is weakened spreads to a certain extent, the form of dropping off as represented by $V_2$ tends to occur at higher frequency upon application of a polishing force on a plurality of crystal grains from a grinding wheel or abrasive grains. In this case, the average size of surface pores to be formed becomes greater than the average grain size of crystal grains adjusted to a grain size of 1–7 µm. Surface pores are formed on the dynamic-pressure gap definition surface in an isotropically scattered fashion, rather than in a fashion scattered in the polishing direction. As a result of surface pores assuming an average size greater than the average grain size of crystal grains, dynamic pressure to be generated can be increased further, thereby realizing stabler rotation of the bearing.

In production of alumina ceramic assuming the above-described microstructure peculiar to the present invention, preferably, an alumina powder used as a material has an average particle size of 1–5 µm. When an alumina powder whose average particle size falls outside the range is used, the sintered body thereby obtained may fail to have an average grain size falling within the previously described preferable range. The average particle size of a powder can be measured by use of a laser diffraction granulometer.

Preferably, the firing temperature falls within a range of 140° C. to 1700° C. When the firing temperature is lower than 1400° C., a sintered body encounters difficulty in undergoing densification, resulting in a failure to assume sufficient strength or wear resistance. By contrast, when the firing temperature is in excess of 1700° C., excessive grain growth occurs, and consequently crystal grains of a sintered body thereby obtained may fail to assume an average grain size that falls within the previously mentioned preferable range. Also, a sintered body is prone to suffer deformation or a like problem, with the result that dimensional accuracy may be impaired.

Preferably, the amount of a sintering aid component as reduced to an oxide thereof is 0.5–10% by weight. When the sintering aid component content is less than 0.5% by weight, a sintered body encounters difficulty in undergoing densification, possibly resulting in a failure to assume sufficient strength or wear resistance. When the sintering aid component content is at such a low level, a liquid phase is hardly generated in the course of sintering, with the result that the growth of crystal grains is restrained. In this case, use of a material powder having the above-mentioned average particle size may raise a problem in that the sintered body encounters difficulty in assuming an average crystal grain size that falls within the previously mentioned range peculiar to the present invention, unless crystal grains grow to a certain extent. By contrast, when the sintering aid component content is in excess of 10% by weight, the strength and wear resistance of a sintered body may be impaired. Preferably, the Al component content of alumina ceramic as reduced to $Al_2O_3$ is 90–99.9% by mass for enhancing strength and toughness, as well as the wear resistance of the dynamic-pressure gap definition surface which is formed of the alumina ceramic.

Preferably, surface pores present on the dynamic-pressure gap definition surface formed of a ceramic assume an average size of 2–20 µm. Through active formation of surface pores having an average size of 2–20 µm, the generated fluid dynamic-pressure can be maintained stably at a high level. Further, in the case of a dynamic-pressure bearing having a thrust dynamic-pressure gap, which will be described below, the incidence of linking can be prevented.

When the average size of surface pores is in excess of 20 µm, excessive turbulence is generated in the dynamic-pressure gap, with the result that the axis of rotation is likely to undergo vibration. By contrast, when the average size of surface pores is less than 2 µm, the dynamic-pressure gap definition surface is prone to suffer adhesion wear, seize-up, or linking when the bearing starts or stops rotating. Also, since fluid dynamic-pressure to be generated in the dynamic-pressure gap tends to become insufficient, rotational runout becomes likely to occur. More preferably, the average size of surface pores is 5–15 µm.

Preferably, the dynamic-pressure gap definition surface is coated with a hard carbon film formed mainly of amorphous carbon and having a thickness smaller than the average size of surface pores. The film prevents potential occurrence of wear and adhesion even when the dynamic-pressure gap definition surfaces come into contact with each other in a state of low-speed rotation, which arises at the time of starting or stopping and tends to involve the occurrence of insufficient dynamic pressure. The "hard carbon film formed mainly of amorphous carbon" refers to a film whose skeleton texture serving as its main body is amorphous and whose Vickers hardness is not less than 1500 kg/mm². The hardness of the film can be measured by use of, for example, a dynamic, ultra-low hardness tester (e.g., NHT, product of CSEM Instruments in Switzerland). The average thickness of the film is rendered smaller than the average size of surface pores in order to prevent excessive blockage of surface pores, which are actively formed for enhancement of a dynamic-pressure generation effect.

The hard carbon film can be formed by the method described in Japanese Patent Publication (kokoku) No. H06-

60404. In this case, preferably, in order to effectively deposit a hard carbon film so as not to block surface pores, which contribute to generation of dynamic pressure, the vapor of a material to be deposited is impinged obliquely on the surface of a member for film deposition.

Surface pores having a size of not greater than 2 $\mu$m cannot contribute much to the generation of dynamic pressure. By contrast, when surface pores having a size in excess of 20 $\mu$m are present in excessive amount, vibration or a like problem is likely to occur. That is, in order to effectively generate dynamic pressure and to realize stable rotation, the size of surface pores is preferably 2–20 $\mu$m. In order to effectively restrain subjecting the dynamic-pressure gap definition surface to seize-up or linking at the time of starting or stopping rotation and to increase fluid dynamic-pressure to be generated in the dynamic-pressure gap, surface pores whose size falls within the above-mentioned range preferably occupy an area percentage of not less than 10%, more preferably not less than 15%, on the dynamic-pressure gap definition surface. In view of effective restraint of occurrence of vibration or a like problem, the area percentage is preferably not greater than 60%, more preferably not greater than 40%.

More preferably, in order to effectively contribute to generation of dynamic pressure and to realize stable rotation, the surface pores assume a size of 5–15 $\mu$m, and surface pores whose size falls within the dimensional range occupy an area percentage of 15–30% on the dynamic-pressure gap definition surface.

Herein, the term "area percentage of surface pores" is a value obtained by dividing the total area of pores observed on the dynamic-pressure gap definition surface by the area of the dynamic-pressure gap definition surface. When known dynamic-pressure grooves are formed on the dynamic-pressure gap definition surface, the area of an effective dynamic-pressure gap definition region after exclusion of the dynamic-pressure grooves from the dynamic-pressure gap definition surface is used for calculating the area percentage of surface pores. The area percentage is measured by the steps of observing the effective dynamic-pressure gap definition region by use of magnifying observation means, such as an optical microscope; determining a square measurement region measuring 300 $\mu$m×300 $\mu$m within the field of observation; and dividing the total area of surface pores observed within the measurement region by the area of the measurement region. Preferably, in order to improve measurement accuracy, five or more measurement regions are arbitrarily determined within a single effective dynamic-pressure gap definition region, and the area percentage of surface pores is obtained by averaging area percentage values of surface pores of the measurement regions.

Preferably, the dynamic-pressure gap definition surface is free, to the greatest possible extent, from surface pores having a size in excess of 20 $\mu$m, since such surface pores are likely to cause occurrence of vibration or a like problem. Specifically, surface pores having a size in excess of 20 $\mu$m occupy an area percentage of not greater than 10%, preferably not greater than 5%, on the dynamic-pressure gap definition surface. In view of prevention of vibration, preferably, the maximum size of surface pores present on the dynamic-pressure gap definition surface is not greater than 100 $\mu$m; i.e., surface pores having a size in excess of 100 $\mu$m are not present.

The first member and the second member, which define a dynamic-pressure gap therebetween, can be formed entirely of alumina ceramic (hereinafter also referred to as "ceramic"). Preferably, the ceramic, which is used to form the members, is a densely sintered body whose microstructure is such that few pores are formed internally, whereas pores are formed in a relatively large amount on the dynamic-pressure gap definition surface, in view of increase of dynamic pressure to be generated, effective prevention of adhesion wear, seize-up, or linking, and enhancement of strength and wear resistance. Specifically, preferably, pores having a size of 2–20 $\mu$m present in the ceramic sintered body are localized mainly on the dynamic-pressure gap definition surface in the form of surface pores. Such a microstructure is efficiently attained by the previously described method, in which ceramic crystal grains are caused to drop off to thereby form surface pores in the course of finishing the dynamic-pressure gap definition surface.

The dynamic-pressure gap definition surface can be a radial dynamic-pressure gap definition surface located radially distant from the axis of rotation of the bearing. Specifically, the first member is formed into a spindle and is inserted into a reception hole formed in the second member; and the inner surface of the reception hole and the outer circumferential surface of the first member to be received inside the inner surface serve as radial dynamic-pressure gap definition surfaces, which define a radial dynamic-pressure gap therebetween.

For example, in a dynamic-pressure bearing having a structure shown in FIG. 1, the radial direction is a direction perpendicular to the axis of rotation (extending vertically in FIG. 1) of the spindle. For example, in FIG. 1, the outer circumferential surface of a spindle—which serves as the first member in a fixed condition—and the inner circumferential surface of a bearing member which serves as the second member assuming the form of a cylindrical rotation body—serve as the radial dynamic-pressure gap definition surfaces. As will be described below, in the case of a bearing elongated along the axis of rotation, whether or not radial dynamic-pressure is sufficiently generated determines whether or not the axis of rotation is supported stably. Application of the present invention to a bearing allows generation of sufficient dynamic pressure in the radial dynamic-pressure gap and effectively prevents or restrains adhesion wear, seize-up, or a like problem at the time of starting and stopping.

The dynamic-pressure gap definition surface can be a thrust dynamic-pressure gap definition surface formed at a certain location in the thrust direction relative to the axis of the rotation body. Specifically, the first member is disposed to face at least one end face of the second member with respect to the axis of rotation; and the end face of the second member and a face of the first member facing the end face serve as the thrust dynamic-pressure gap definition surfaces, which define a thrust dynamic-pressure gap therebetween.

For example, in the dynamic-pressure bearing having a structure shown in FIG. 1, the thrust direction is the axial direction of the spindle; i.e., a direction along which the axis of rotation extends (the vertical direction in FIG. 1). For example, in FIG. 1, an end face of the bearing member— which serves as the second member assuming the form of a cylindrical rotation body—and a face of a thrust plate— which serves as the first member facing the end face of the bearing member with respect to the axis of rotation—serve as the thrust dynamic-pressure gap definition surfaces. The thrust dynamic-pressure gap definition surfaces may be slightly inclined from a plane perpendicular to the axis of rotation. As will be described below, in the case of a bearing which is of short length along the axis of rotation, whether or not radial dynamic-pressure is sufficiently generated determines whether or not the axis of rotation is stably supported. Application of the present invention to a bearing allows generation of sufficient dynamic pressure in the thrust dynamic-pressure gap and effectively prevents or restrains adhesion wear, seize-up, or linking at the time of starting and stopping.

As shown in FIG. 1, a single bearing can have both a radial dynamic-pressure gap and a thrust dynamic-pressure gap. In this case, the first member (or the second member) as viewed from the standpoint of the radial dynamic-pressure gap and the first member (or the second member) as viewed from the standpoint of the thrust dynamic-pressure gap may be the same member or mutually different members depending on the form of the dynamic-pressure gaps. For example, in the case of FIG. 1, the second member is the bearing member as viewed from the standpoint of either dynamic-pressure gap; and the inner circumferential surface of the bearing member serves as the radial dynamic-pressure gap definition surface, whereas the opposite end faces of the bearing member serve as the thrust dynamic-pressure gap definition surfaces. As for the first member, the spindle is the first member as viewed from the standpoint of the radial dynamic-pressure gap, whereas a pair of thrust plates facing the corresponding opposite end faces of the bearing member is the first member as viewed from the standpoint of the thrust dynamic-pressure gap. The spindle is a nonrotating fixed shaft. Notably, as shown in FIG. 10, a bearing 251 is configured such that a spindle 212 is a rotating member, whereas a cylindrical bearing member 221 is a fixed member.

The dynamic-pressure bearing of the present invention can be configured such that the axial length thereof is longer than the outside diameter of the thrust dynamic-pressure gap definition surface, or a thrust dynamic-pressure gap is not formed and such that the inclination of the rotation body during rotation is restricted by dynamic pressure generated in the radial dynamic-pressure gap. This defines, for example, a dynamic-pressure bearing having a long axial length as shown in FIG. 7. When a bearing member 35 serving as a rotation body inclines, the inclination is corrected by the action of pressure generated in a radial dynamic-pressure gap 37. By contrast, the dynamic-pressure bearing can also be configured such that the axial length thereof is shorter than the outside diameter of the thrust dynamic-pressure gap definition surface and such that the inclination of the rotation body during rotation is restricted mainly by dynamic pressure generated in the thrust dynamic-pressure gap. This defines, for example, a dynamic-pressure bearing having a short axial length as shown in FIG. 3. When a bearing member serving as a rotation body inclines, the inclination is corrected by the action of dynamic pressure generated in the thrust dynamic-pressure gaps.

Dynamic-pressure grooves may be formed on the dynamic-pressure gap definition surface. For example, formation of known dynamic-pressure grooves on the outer circumferential surface, which serves as the radial dynamic-pressure gap definition surface, of a rotary spindle can realize far smoother rotation. As shown in FIG. 2(a), a plurality of dynamic-pressure grooves can be formed on the outer circumferential surface of the spindle (on the radial dynamic-pressure gap definition surface) while being arranged at predetermined intervals along the circumferential direction. In the embodiment of FIG. 2(a), linear grooves are arrayed while being inclined at a certain angle with respect to a generatrix of the outer circumferential surface of the spindle. However, dynamic-pressure grooves in any other known form can be used. For example, dynamic-pressure grooves in a so-called herringbone form can be used. Specifically, angle (boomerang-like) grooves are formed on the outer circumferential surface at predetermined intervals along the entire circumference such that the tips of the grooves are located on a circumferential reference line. Also, as shown in FIG. 2(b), dynamic-pressure grooves may be formed on the surface of a thrust plate (on the thrust dynamic-pressure gap definition surface). In FIG. 2(b), a plurality of curved grooves are formed on the surface of the thrust plate while being arranged at predetermined intervals in the circumferential direction of the thrust plate, which grooves are curved such that the distance between the center of the thrust plate and a point on each groove reduces gradually toward the inner end of the groove.

The dynamic-pressure bearing of the present invention can be effectively used with, for example, a spindle for rotating a hard disk of a hard disk drive, a spindle for rotating a disk of peripheral equipment, such as a CD-ROM drive, an MO drive, or a DVD drive, for computer use, and a spindle for rotating a polygon mirror of a polygon scanner for use in a laser printer, a copying machine, or a like machine. A bearing used in a rotational drive unit of such precision equipment is subjected to high-speed rotation at a speed of, for example, 8,000 rpm or higher (in some cases, even at a speed of 10,000–30,000 rpm or higher). Application of the present invention to such a bearing enables stable maintenance of generated fluid dynamic-pressure at high level to thereby effectively yield the effect of reducing vibration or the like. Also, the present invention provides a motor having a bearing in which the above-described ceramic dynamic-pressure bearing is used in a rotation output section. Further, the present invention provides a hard disk drive comprising the above-mentioned motor having a bearing and a hard disk to be rotationally driven by the motor as well as a polygon scanner comprising the above-mentioned motor having a bearing and a polygon mirror rotationally driven by the motor.

Alumina ceramic can be mixed with zirconia ceramic to obtain a composite ceramic material having high toughness. A product of such a composite ceramic material is formed in the following manner. A ceramic powder which contains either alumina or zirconia as a ceramic component of the highest content and the other as a ceramic component of the second highest content is formed into a green body, which is then fired to become a composite ceramic product. Preferably, zirconia ceramic is contained in an amount of 5–60% by volume based on the amount of alumina ceramic.

The composite ceramic material may contain alumina ceramic as matrix and an electrically conductive, inorganic compound phase whose metal cation component is at least any one of Ti, Zr, Nb, Ta, and W. A product of such a composite ceramic material is formed in the following manner. A material powder for forming matrix ceramic is mixed with a material powder for forming the electrically conductive, inorganic compound phase. The resulting mixed powder is formed into a green body, which is then fired to become a composite ceramic product. The electrically conductive, inorganic compound phase contained in a ceramic product imparts electrical conductivity to the ceramic product and thus enables the ceramic product to undergo electric discharge machining, such as wire-cut electric discharge machining. Imparting electrical conductivity yields an antistat effect.

The electrically conductive, inorganic compound can assume the form of at least any one of a metal nitride, a metal carbide, a metal boride, and a metal carbonitride which contain, as a metal cation component, at least any one of Ti, Zr, Nb, and Ta, as well as tungsten carbide. Specific examples of the electrically conductive, inorganic compound include titanium nitride, titanium carbide, titanium boride, tungsten carbide, zirconium nitride, titanium carbonitride, and niobium carbide. Preferably, the composite ceramic material contains the electrically conductive, inorganic compound phase in an amount of 20–60% by volume in order to attain sufficient enhancement of electrical conductivity while maintaining strength and fracture toughness. When the above-described composite ceramic is used, the previously described alumina content or sintering aid content is not of the composite ceramic, but of the alumina ceramic serving as a matrix.

Figure 1:
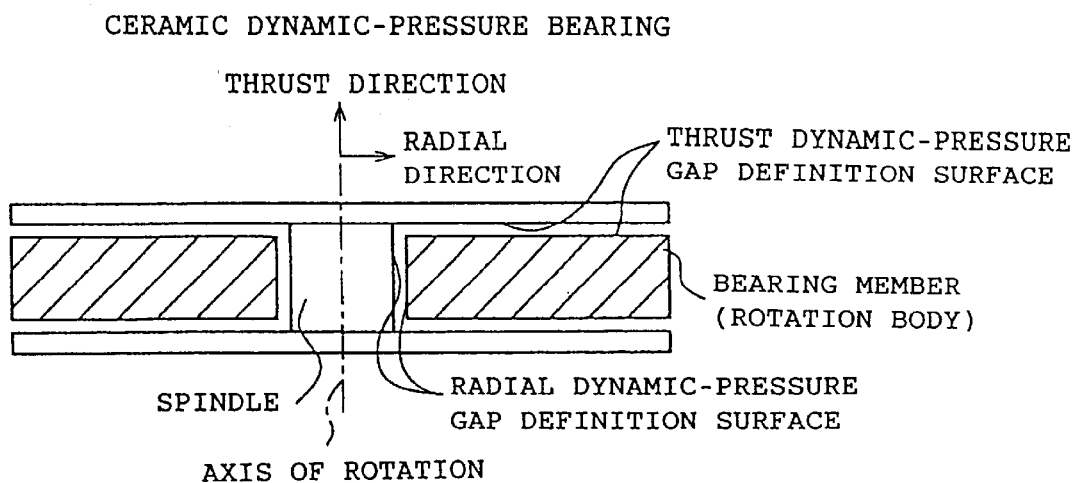
FIG. 1 is a schematic sectional view showing a structural example of a ceramic dynamic-pressure bearing of the present invention.

DESCRIPTION OF REFERENCE NUMERALS 1, 90: polygon scanner
3, 33, 101,251: ceramic dynamic-pressure bearing
14, 39, 105, 212: spindle
15,35, 107,221: bearing member
17, 38, 91, 240: radial dynamic-pressure gap
18, 92: thrust dynamic-pressure gap 21, 23, 103, 109, 222: thrust plate
M: dynamic-pressure gap definition surface
M1, M2: radial dynamic-pressure gap definition surface
M3–M6: thrust dynamic-pressure gap definition surface

DETAILED DESCRIPTION OF THE PREFERRED EMBODIMENTS

Embodiments of the present invention will next be described with reference to the drawings. However, the present invention should not be construed as being limited thereto.

First Embodiment

Figure 3:
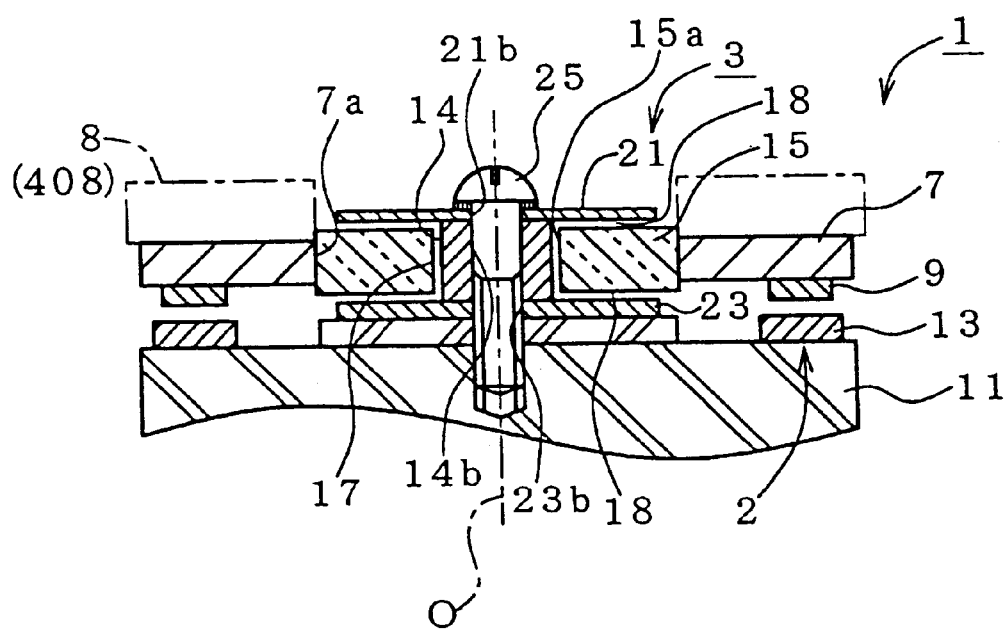
FIG. 3 is a sectional front view showing an example of a polygon scanner motor unit including a ceramic dynamic-pressure bearing of the present invention.

A ceramic dynamic-pressure bearing (hereinafter also referred to as a "dynamic-pressure bearing") 3 shown in FIG. 3 is used, for example, in a motor for rotating a polygon mirror 8 in a polygon scanner 1, and uses air as dynamic-pressure generation fluid. In a motor having a dynamic-pressure bearing 2, in order to rotate a cylindrical bearing member 15 (a rotation body), a permanent magnet 9 is mounted on a support member 7, which is integrally attached to the outer circumferential surface of the bearing member 15, whereas a coil 13 is mounted on a base 11 and faces the permanent magnet 9. The arrangement of the permanent magnet 9 and the coil 13 may be reversed.

Figure 4:
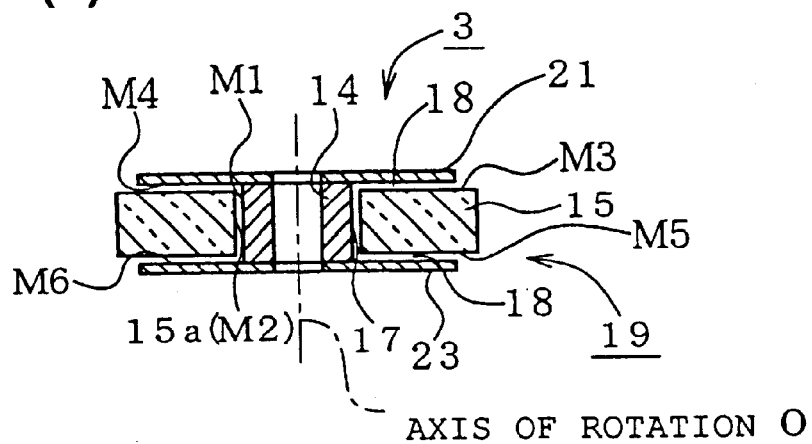
FIGS. 4(a) and 4(b) are a sectional front view and an exploded perspective view showing the ceramic dynamic-pressure bearing of the motor unit of FIG. 3.
Figure 4:
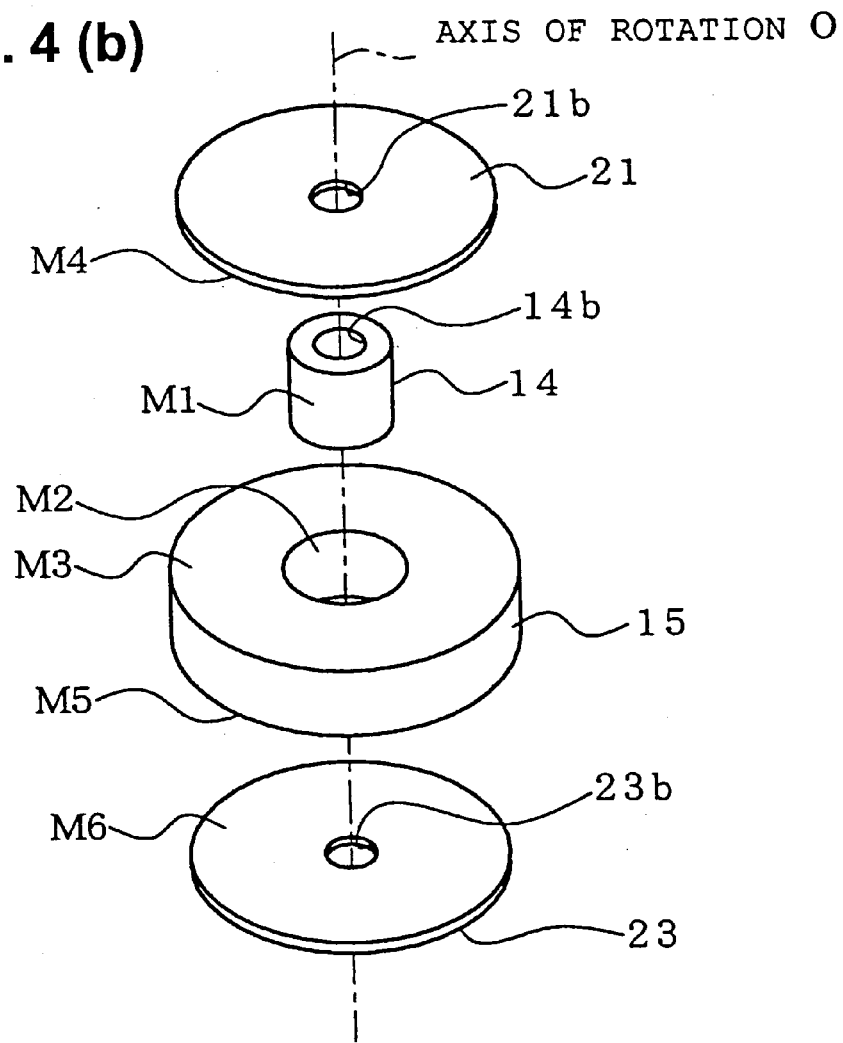

The ceramic dynamic-pressure bearing 3 is configured such that a cylindrical spindle (e.g., inner diameter: 5 mm, outer diameter: 15 mm, axial length: 8 mm) 14 is inserted into a reception hole 15a of a cylindrical bearing member (e.g., inner diameter: 15 mm, outer diameter: 25 mm, axial length: 8 mm) 15. As shown in FIG. 4, an inner circumferential surface M2 of the reception hole 15a and an outer circumferential surface M1 of the spindle 14 serve as radial dynamic-pressure gap definition surfaces. A radial dynamic-pressure gap 17 filled with air is formed between the inner circumferential surface M2 and the outer circumferential surface M1 so as to generate dynamic pressure that is effective in the radial direction relative to an axis of rotation O. The radial dynamic-pressure gap 17 has a size of, for example, about 5 μm. When viewed from the standpoint of the radial dynamic-pressure gap 17, the spindle 14 is the first member, and the bearing member 15 is the second member.

Disk-like thrust plates (e.g., inner diameter: 5 mm, outer diameter: 25 mm, thickness: 2 mm) 21 and 23 are coaxially attached to the corresponding opposite end faces of the spindle 14. Inner plate faces M4 and M6 of the thrust plates 21 and 23 face opposite end faces M3 and M5 of the bearing member 15 serving as a rotation body. As shown in FIG. 3, the thrust plates 21 and 23 are placed on the corresponding end faces of the spindle 14 such that center holes 21b and 23b of the thrust plates 21 and 23 are aligned with a center hole 14b of the spindle 14. A bolt 25 is inserted into the center hole 14b and is screwed into the base 11 to thereby fix the thrust plates 21 and 23 on the end faces of the spindle 14. However, the form of fixation is not limited thereto.

As shown in the ceramic dynamic-pressure bearing 19 of FIGS. 4(a) and 4(b), the plate faces M4 and M6 of the thrust plates 21 and 23 and the opposite end faces M3 and M5 of the bearing member 15 serve as the thrust dynamic-pressure gap definition surfaces, and thrust dynamic-pressure gaps 18 filled with air are formed therebetween so as to generate dynamic pressure that is effective in the direction of the axis of rotation O; i.e., in the thrust direction. Each of the thrust dynamic-pressure gaps 18 has a size of, for example, about 6 μm. When viewed from the standpoint of the thrust dynamic-pressure gaps 18, the thrust plates 21 and 23 are the first members, and the bearing member 15 is the second member.

Figure 5:
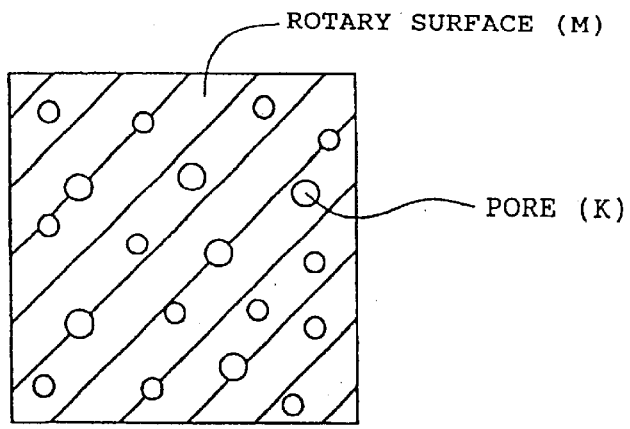
FIGS. 5(a)–5(d) are a schematic view showing a dynamic-pressure gap definition surface having surface pores formed thereon and explanatory views showing how surface pores are formed as a result of dropping off of grains during polishing.
Figure 5:
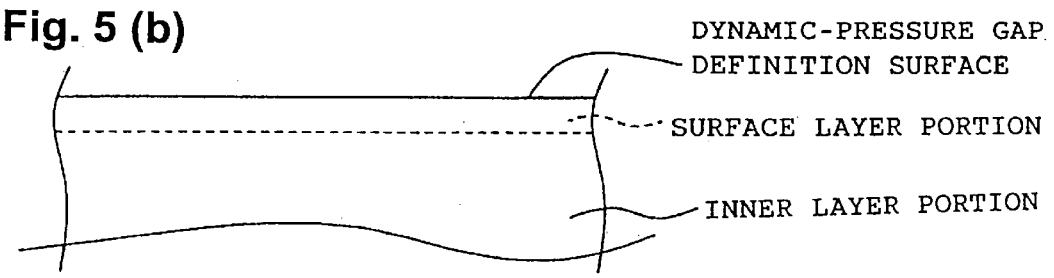
Figure 5:
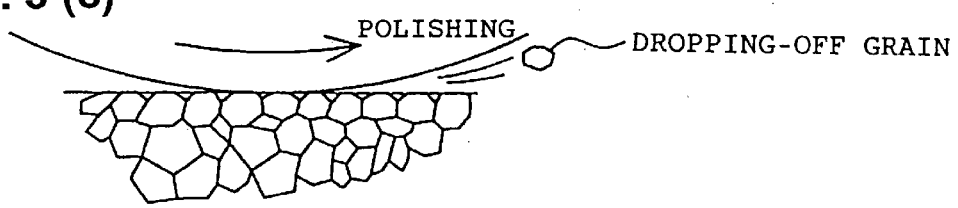
Figure 5:
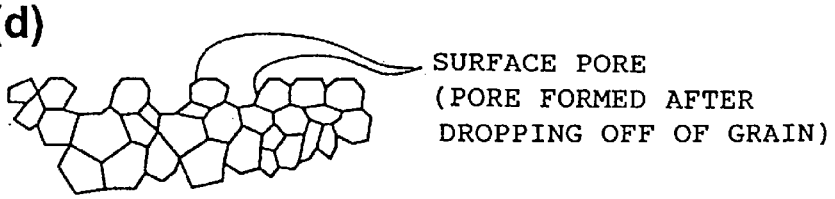
Figure 6:
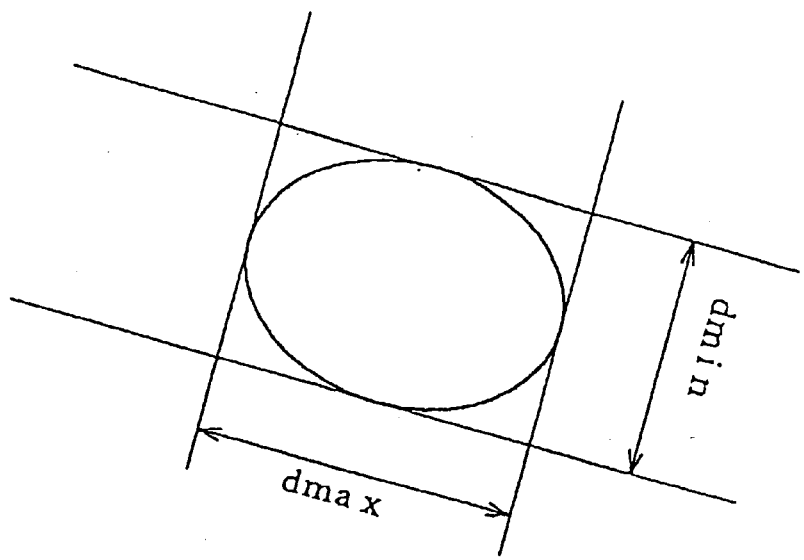
FIG. 6 is an explanatory view showing the definition of the size of a pore (or a crystal grain).

In the present embodiment, each of the spindle 14, the bearing member 15, and the thrust plates 21 and 23 is entirely formed of alumina ceramic, whose apparent density is 3.5–3.9 g/cm$^3$, preferably 3.6–3.8 g/cm$^3$ and whose relative density is 90–98%, preferably 94–97%. Ceramic crystal grains in the dynamic-pressure gap definition surfaces M1–M6 have an average grain size of 1–7 μm, preferably 2–5 μm. Also, ceramic crystal grains having a grain size of 2–5 μm occupy an area percentage of 50–80%. Further, as shown in FIG. 5, a number of surface pores K are formed on the dynamic-pressure gap definition surfaces M1–M6.

As described above, according to the configuration of the present invention, generation of vibration can be effectively prevented during rotation of the ceramic dynamic-pressure bearing 3, and surface pores can be favorably formed on the dynamic-pressure gap definition surface such that the dynamic-pressure gap definition surface is not prone to suffer adhesion wear when the ceramic dynamic-pressure bearing 3 starts or stops rotating. Also, generated fluid dynamic-pressure can be maintained stably at a high level. Further, at the thrust dynamic-pressure generation gaps 18, linking between the thrust plates 21 and 23 and the bearing member 15 can be effectively prevented.

In this case, surface pores actively formed on the dynamic-pressure gap definition surface in the course of polishing, which will be described below, have an average size of 2–20 μm. When surface pores whose average size falls within the range occupy an average area percentage of 10–60%, preferably 15–40%, on the dynamic-pressure gap definition surface, occurrence of the above-mentioned adhesion wear or linking becomes more unlikely, and fluid dynamic-pressure that is to be generated in the dynamic-pressure gap can be increased.

The above-described effects are obtained when the size and the area percentage of surface pores K are adjusted to the above-mentioned respective ranges with respect to at least one of the dynamic-pressure gap definition surfaces M1 to M6 (e.g., only either one of the radial dynamic-pressure gap definition surfaces M1 and M2, only either one of the thrust dynamic-pressure gap definition surfaces M3 and M4, or only either one of the thrust dynamic-pressure gap definition surfaces M5 and M6). Preferably, in order to enhance the effects, the size and the area percentage of surface pores K are adjusted to the above-mentioned respective ranges with respect to as many dynamic-pressure gap definition surfaces as possible, ideally all of the dynamic-pressure gap definition surfaces M1 to M6.

In order to increase the dynamic pressure that is to be generated, known dynamic-pressure grooves as shown in FIG. 2(a) can be formed on at least either one of the radial dynamic-pressure gap definition surfaces M1 and M2 (e.g., on the surface M1 of the spindle 14). Also, known dynamic-pressure grooves as shown in FIG. 2(b) can be formed on at least any one of the thrust dynamic-pressure gap definition surfaces M3 to M6 (e.g., on the surfaces M4 and M6 of the thrust plates 21 and 23).

A method for manufacturing the above-described ceramic dynamic-pressure bearing 3 will next be described.

The ceramic members; i.e., the spindle 14, the bearing member 15, and the thrust plates 21 and 23 can be manufactured by a known sintering process. Specifically, an alumina material powder having an average particle size of 1–5 μm is mixed with an oxide powder(s), such as MgO, CaO, CeO$_2$, SiO$_2$, or Na$_2$O, serving as a sintering aid powder(s) to thereby obtain a forming material powder. The forming material powder is press-formed into a green body in a corresponding shape by a known forming process, such as a die pressing process or a cold isostatic pressing process. The green body is fired at a temperature of 1400–1700° C. to thereby obtain a sintered body. The sintered body is polished at a required surface including a surface which is to become the dynamic-pressure gap definition surface so as to have predetermined dimensions.

As shown in FIG. 5(c), when the dynamic-pressure gap definition surface is formed through polishing by use of a grinder or lapping by use of abrasive grains, ceramic crystal grains drop off in the course of polishing, thereby forming surface pores. The average size, the size distribution, and the area percentage of surface pores to be formed are adjusted to the aforementioned respective ranges by adjusting the average grain size and the grain size distribution of ceramic crystal grains of the sintered body, the grain size (abrasive No.) of abrasive grains of a grinding wheel or abrasive grains for lapping use, and polishing conditions, such as polishing time period. Since the composition and distribution of the grain boundary phase derived from a sintering aid may influence proneness to dropping off of ceramic crystal grains in the course of polishing, this must also be considered in determining the polishing conditions and must be adjusted as adequate so as to favorably form surface pores.

A ceramic member whose dynamic-pressure gap definition surface is finished as described above assumes a microstructure such that pores are formed on the surface of a dense sintered body as a result of dropping of ceramic grains; i.e., a particular microstructure such that, as shown in FIG. 5(b), an inner layer portion is denser than a surface layer portion, where surface pores are present. Accordingly, the presence of surface pores prevents occurrence of adhesion wear or linking and effectively increases dynamic pressure that is to be generated, and the formation of the dense inner layer portion enhances the strength of the ceramic member. Since a dense microstructure is maintained in a region of the surface layer portion other than surface pores, wear resistance is significantly improved as compared to a porous ceramic sintered body, which is formed without undergoing densification.

Upon completion of polishing of the dynamic-pressure gap definition surfaces M, the aforementioned dynamic-pressure grooves are formed by sand blasting, etching, or a like process, thereby yielding the spindle 14, the bearing member 15, or the thrust plates 21 and 23. Then, as shown in FIG. 3, the support (herein, formed into a disk-like shape having a hole portion 7a into which the bearing member 15 is fitted) 7, the permanent magnet 9, and the coil 13 are mounted by bonding or a like process. Further, the spindle 14, the bearing member 15, and the thrust plates 21 and 23 are assembled by use of the bolt 25, thereby yielding a motor having a dynamic-pressure bearing. Attachment of the polygon mirror 8 onto the support member 7 completes assembly of the polygon scanner 1.

The polygon scanner I operates in the following manner. The motor having a dynamic-pressure bearing 2 is configured as an alternating-current induction motor. When electricity is applied to the coil 13, the polygon mirror 8, the bearing member 15, and the support member 7 are rotated unitarily, whereas the spindle 14 serves as a fixed spindle. The polygon mirror 8 is rotated at a maximum rotational speed of 8000 rpm or higher or at a maximum rotational speed of 10000 rpm or higher or even 30000 rpm or higher (e.g., about 50000 rpm) when higher scanning speed is required. Accordingly, the number of turns of the coil 13, the intensity of an external magnetic field to be generated for excitation use by the permanent magnet 9, rated drive voltage, etc., are determined as appropriate so as to realize the above-mentioned maximum rotational speed, with the load of rotation of the polygon mirror 8 taken into account. Radial dynamic-pressure, which is effective in the radial direction relative to the axis of rotation O, is generated in the radial dynamic-pressure gap 17 formed between the spindle 14 and the bearing member 15, whereas thrust dynamic-pressure is generated in the thrust dynamic-pressure gaps 18 formed between the thrust plates 21 and 23 and the bearing member 15. Thus, the axis of rotation of the polygon mirror 8 is supported in the radial and thrust directions while the members that undergo relative rotation are maintained in a non-contacting state.

Figure 7:
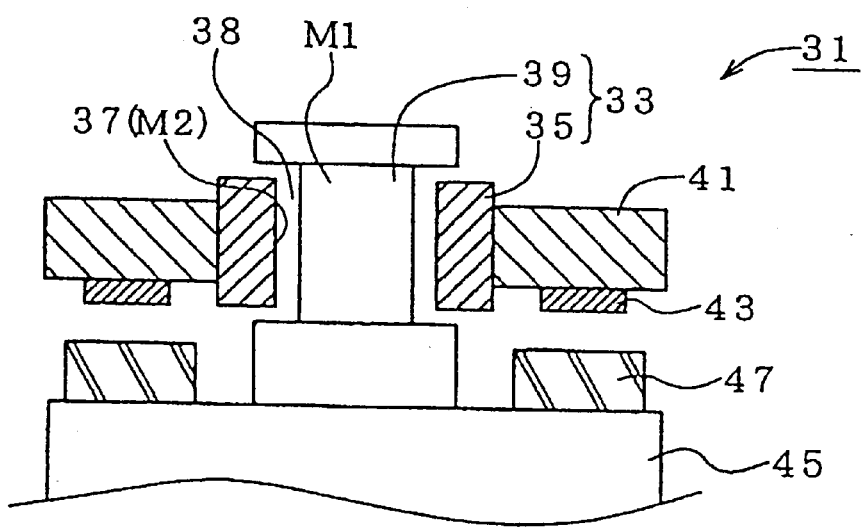
FIG. 7 is a schematic sectional view showing a modified example of a motor unit including a ceramic dynamic-pressure bearing of the present invention.

Next, FIG. 7 shows another example of a motor to be used in a polygon scanner (illustration of a polygon mirror is omitted). The motor 31 includes a ceramic dynamic-pressure bearing 33 of the present invention, which bearing 33 is configured in a manner similar to that shown in FIG. 3. The ceramic dynamic-pressure bearing 33 includes a cylindrical bearing member 35 (e.g., inner diameter: slightly greater than 13 mm, outer diameter: 25 mm, axial length: 5 mm) and a spindle 39 (diameter: slightly less than 13 mm, length: 8 mm) which is axially inserted into a reception hole 37 of the bearing member 35. The spindle 39 is fixed and therefore does not rotate; i.e., the bearing member 35, which surrounds the spindle 39, rotates. The inner circumferential surface of the bearing member 35 and the outer circumferential surface of the spindle 39 serve as radial dynamic-pressure gap definition surfaces M2 and M1, respectively. A radial dynamic-pressure gap 38 is formed between the surfaces M2 and M1. In the ceramic dynamic-pressure bearing 33 of FIG. 7, the bearing member 35 and the spindle 39 are greater in axial dimension than those of the ceramic dynamic-pressure bearing 3 of FIG. 3; thus, radial dynamic-pressure serves as a main source of a force for supporting the axis of rotation O. Therefore, the thrust plates are omitted.

As in the case of the ceramic dynamic-pressure bearing 3 of FIG. 3, a permanent magnet 43 is disposed on an annular support member 41, which is unitarily attached to the outer circumferential surface of the bearing member 35. A coil 47 is mounted on a base 45 so as to face the permanent magnet 43. Dynamic-pressure grooves as shown in FIG. 2(a) are formed on the dynamic-pressure gap definition surface M of at least either one of the bearing member 35 and the spindle 39; for example, on the outer dynamic-pressure gap definition surface (outer radial dynamic-pressure gap definition surface) M1 of the spindle 39.

Figure 8:
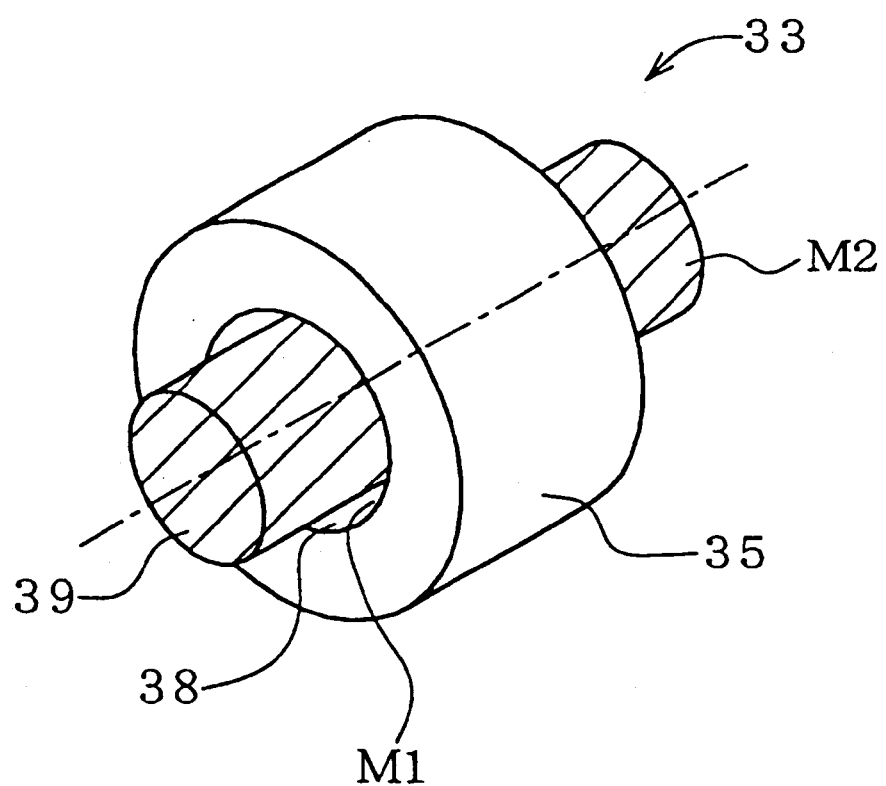
FIG. 8 is a perspective view showing a main portion of another modified example of a motor unit including a ceramic dynamic-pressure bearing of the present invention.

At least either one of the spindle 39 and the bearing member 35 can be formed of a material other than ceramic; for example, a metal. FIG. 8 shows an example in which the spindle 39 is formed of stainless steel, whereas the bearing member 35 is formed of ceramic. Alternatively, the configuration may be reversed; i.e., the spindle 39 is formed of ceramic, whereas the bearing member 35 is formed of a metal.

Figure 9:
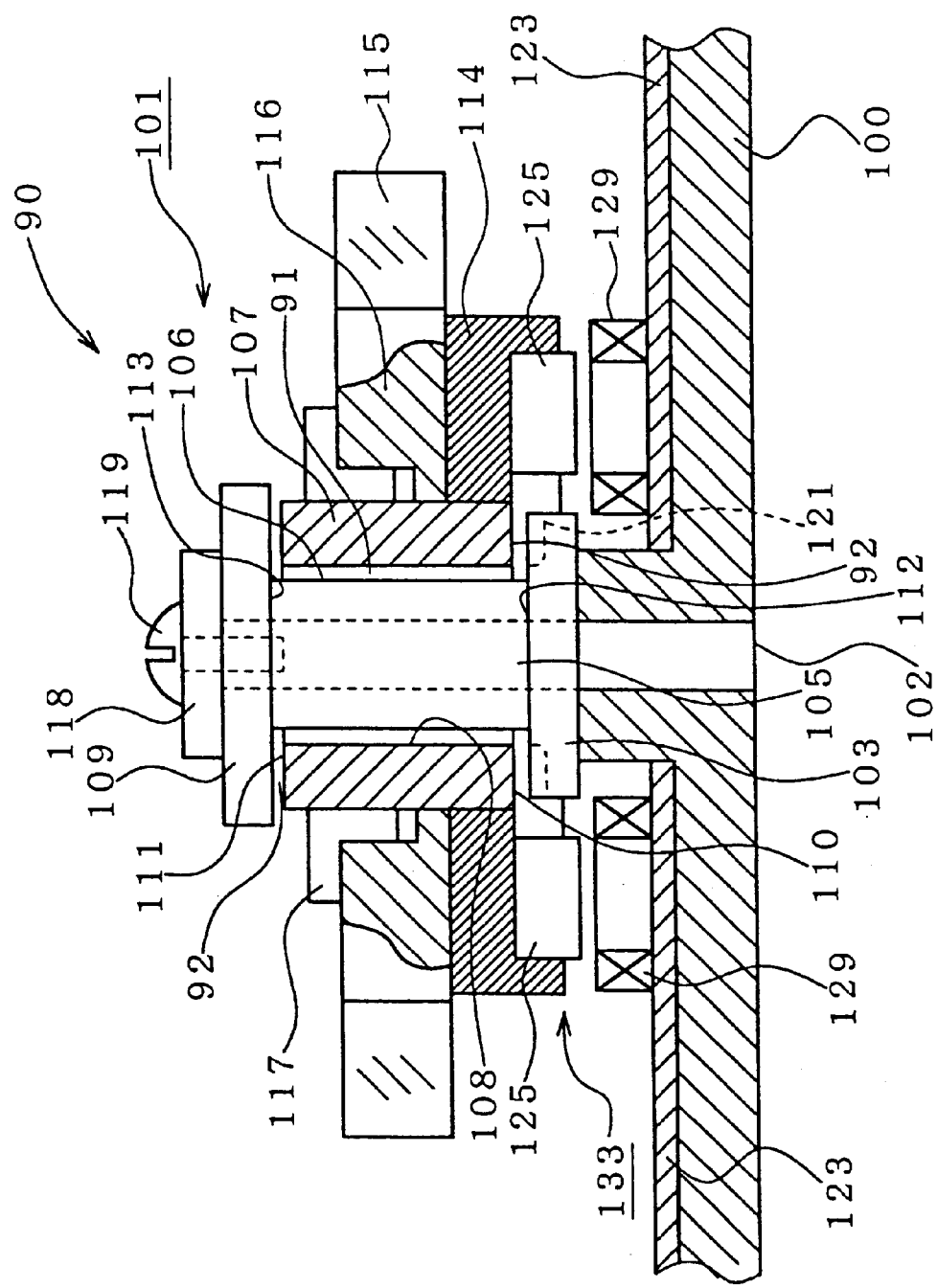
FIG. 9 is a sectional front view showing an example of a polygon scanner including a ceramic dynamic-pressure bearing of the present invention.

FIG. 9 shows a specific configuration example of a polygon scanner. In a polygon scanner 90, a core rod 102 for fixedly supporting a ceramic dynamic-pressure bearing 101 of the present invention is fixed at one end thereof on a base 100 in a vertically standing condition. A lower thrust plate 103 made of ceramic is fixedly attached to the core rod 102. A spindle 105 made of ceramic is fixedly attached to the core rod 102 such that the core rod 102 extends through the spindle 105. A bearing member 107 made of ceramic is rotatably disposed such that a radial dynamic-pressure gap 91 (1–7 $\mu$m) is formed between the cylindrical outer surface of the spindle 105 serving as a radial dynamic-pressure gap definition surface 106 and the inner circumferential surface of the bearing member 107 serving as a radial dynamic-pressure gap definition surface 108. An upper thrust plate 109 made of ceramic is fixedly attached to the core rod 102 such that the core rod 102 extends through the upper thrust plate 109. Thrust dynamic-pressure gaps 92 are formed respectively between the upper end face of the bearing member 107 serving as a thrust dynamic-pressure gap definition surface 111 and a thrust dynamic-pressure gap definition surface 113 of the upper thrust plate 109 and between the lower end face of the bearing member 107 serving as a thrust dynamic-pressure gap definition surface 110 and a thrust dynamic-pressure gap definition surface 112 of the lower thrust plate 103. The ceramic members are also formed of alumina ceramic and are similar to those of the ceramic dynamic-pressure bearings 3 and 33 of FIGS. 3 and 7 in terms of microstructure and composition.

A discrete support member 114 is fixedly attached to the outer circumferential surface of the bearing member 107, and a polygon mirror 116 having a number of reflecting surfaces 115 is fixed on the support member 114 by use of a fixture member 117 (a rotation body and the support member 114 may be integrally formed). The other end of the core rod 102 is fixed by use of a retainer plate 118 and a bolt 119. Further, dynamic-pressure grooves 121 similar to those shown in FIG. 2(b) are formed on the thrust dynamic-pressure gap definition surface 112 of the lower thrust plate 103. Also, dynamic-pressure grooves (not illustrated) similar to those shown in FIG. 2(a) are formed on the outer circumferential surface (hereinafter also referred to as the "outer circumferential surface 106") of the spindle 105 serving as the radial dynamic-pressure gap definition surface 106.

A winding 129 is disposed on the base 100 via an insulating member 123, and a magnet 125 is disposed on a bottom portion of the support member 114 of the bearing member 107 so as to face the winding 129, whereby a three-phase brushless motor 133 is configured. The three-phase brushless motor 133 functions as a drive motor for the bearing member 107 such that, when electricity is applied to the winding 129, the bearing member 107 is inductively rotated at high speed. Rotation of the three-phase brushless motor 133 causes generation of dynamic pressure in the radial dynamic-pressure gap 91 to thereby enable smooth high-speed rotation.

When the bearing member 107 is not rotating, the lower end face 110 of the bearing member 107 and the thrust dynamic-pressure gap definition surface 112 of the lower thrust plate 103 are in contact with each other. When the bearing member 107 starts rotating about the spindle 105, thrust dynamic-pressure is generated in the thrust dynamic-pressure gap 92, thereby changing the contacting state to a non-contacting state and thus enabling high-speed rotation.

Figure 10:
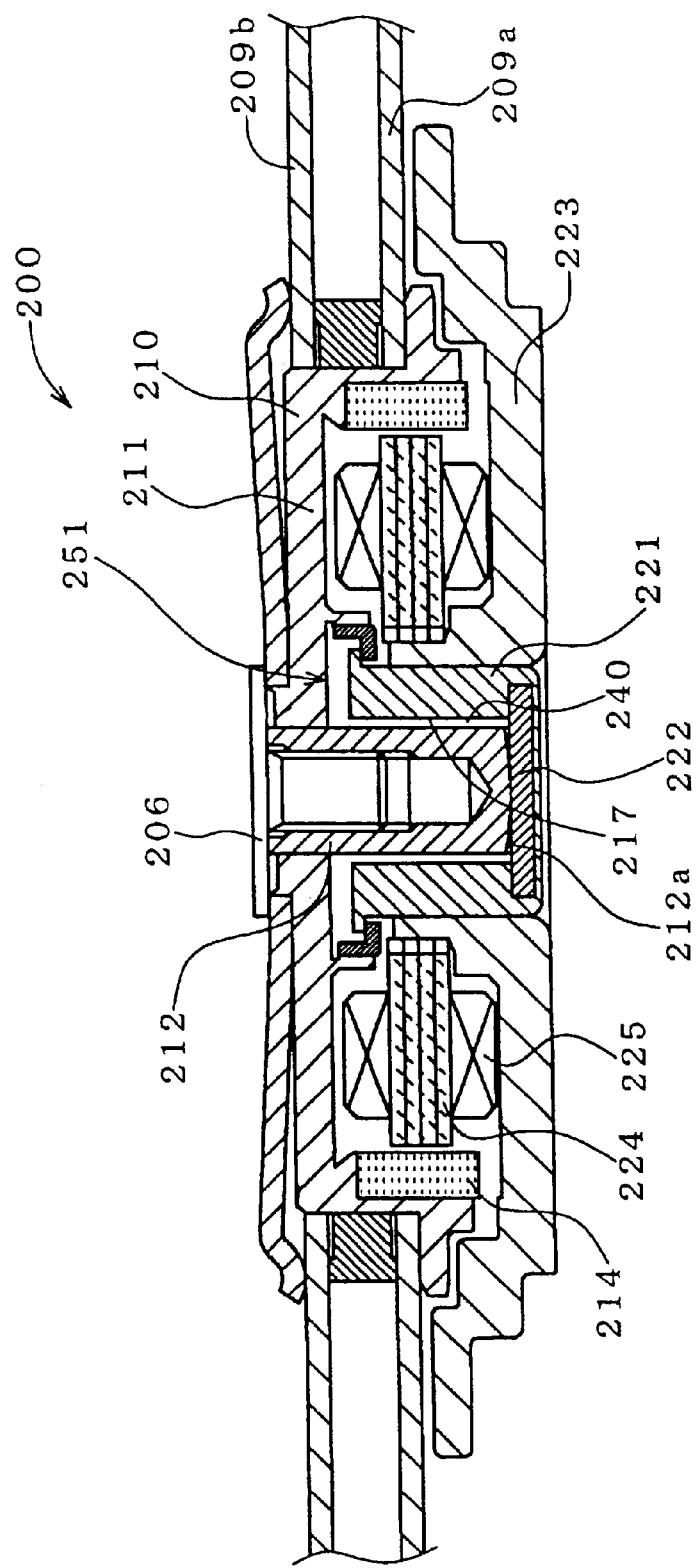
FIG. 10 is a sectional front view showing an example of a hard disk drive including a ceramic dynamic-pressure bearing of the present invention.
Figure 11:
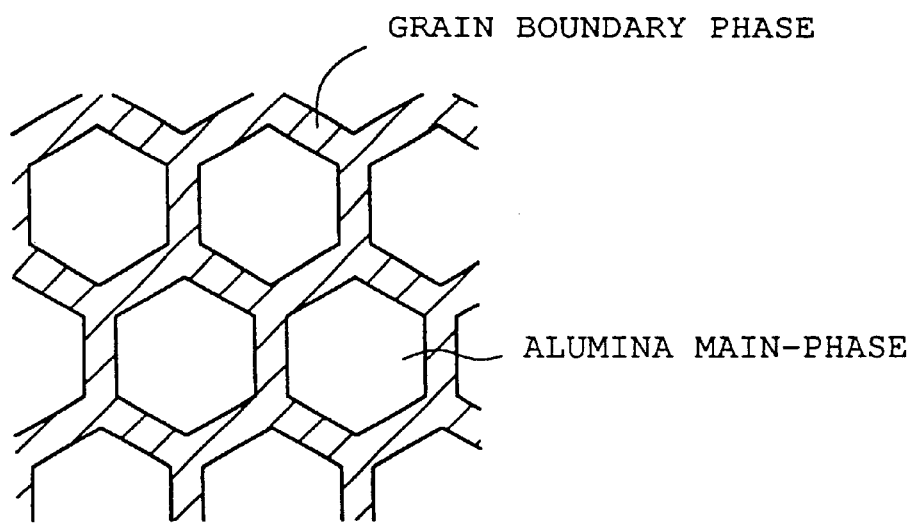
FIG. 11 is a schematic view showing the microstructure of an alumina ceramic sintered body.
Figure 12:
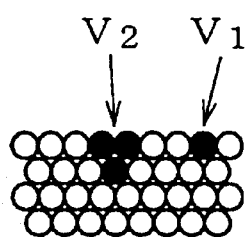
FIGS. 12(a) and 12(b) are schematic views showing various forms of a pore formed by dropping off of a ceramic crystal grain(s).
Figure 12:
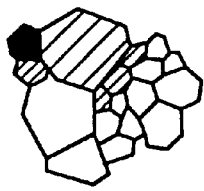

FIG. 10 shows an example in which the present invention is applied to a hard disk drive. The hard disk drive 200 is configured such that magnetic disks 209a and 209b are fixed on the outer circumferential surface of a hub 211, and a motor rotary-spindle 212 is fixedly attached to the hub 211 at the center of the hub 211. The hub 211 rotates together with the disks 209a and 209b fixed thereto. The motor rotary-spindle 212 is supported in the radial direction by a fixed bearing member 221 formed of alumina ceramic and is supported in the thrust direction by a thrust plate 222 formed of alumina ceramic.

Since the motor rotary-spindle 212, the fixed bearing member 221, and the thrust plate 222 are formed of a ceramic material, the motor rotary-spindle 212 and the fixed bearing member 221 have mechanical rigidity capable of enduring a load of the disks 209a and 209b rotating at high speed and high-speed rotation.

The gap formed between the motor rotary-spindle 212 and the fixed bearing member 221 and the gap formed between the motor rotary-spindle 212 and the thrust plate 222 are filled with air; a radial dynamic-pressure gap 240 is formed along the circumferential direction between the motor rotary-spindle 212 and the fixed bearing member 221; and unillustrated dynamic-pressure grooves are formed on an inner circumferential surface 217 of the fixed bearing member 221. As the motor rotary-spindle 212 rotates, radial dynamic-pressure is generated in the radial dynamic-pressure gap 240, whereby the motor rotary-spindle 212 rotates in a non-contacting state relative to the fixed bearing member 221. The outer circumferential surface of the motor rotary-spindle 212 serving as the radial dynamic-pressure gap definition surface and the inner circumferential surface of the fixed bearing member 221 are configured similar to those of the ceramic dynamic-pressure bearings 3 and 33 of FIGS. 3 and 7 (i.e., configured as the ceramic dynamic-pressure bearing of the present invention). An end 212a of the motor rotary-spindle 212 assumes the form of a spherical pivot such that the thrust plate 222 bears a thrust force of the motor rotary-spindle 212.

In the hard disk drive 200, a stator core 224 is fixed on a bracket 223. A stator coil 225 is wound on the stator core 224. As in the case of the polygon scanner of FIG. 9, a rotational drive force of the motor is generated by means of a rotating magnetic field, which is generated by the stator core 224 excited through application of current to the stator coil 225, and a drive magnet 214, which surrounds the stator core 224 and is magnetized in a multipolar condition. The magnet 214 is fixedly attached to the inner circumferential surface of the hub 211, whereby the magnet 214 and the hub 211 constitute a rotor 210. In the hard disk drive 200, the outer bearing member 221 is fixed, whereas the inner spindle (a rotary spindle) 212 rotates. However, referring to FIG. 3, the polygon mirror 8 may be replaced with a magnetic disk 408, whereby a hard disk drive can be configured such that the bearing member 15 rotates, whereas the spindle 14 is fixed.

The present invention is not limited to the above-described embodiments, and may be practiced in various manners without departing from the scope of the present invention. For example, the dynamic-pressure generation fluid may be a gas other than air or a liquid, such as oil or water.

EXAMPLES

In order to confirm the effects of the present invention, the following experiments were carried out.

First, the bearing member 15, the spindle 14, and the thrust plates 21 and 23 were manufactured in the form of alumina ceramic sintered body in the following manner. Prepared materials were alumina powders (purity: 99.9%) having various average particle sizes indicated in Table 1 as measured by a laser diffractometer and a sintering aid powder obtained by mixing a $SiO_2$ powder, a CaO powder, and an MgO powder in weight ratios of 3:1:1. Each of the alumina powders and the sintering aid powder were mixed such that the sintering aid powder was contained in an amount of 0.3–15% by mass, and the balance alumina powder. Water and an appropriate amount of PVA serving as a binder were added thereto, followed by wet mixing. The resultant mixture was spray-dried, thereby yielding a granulation material powder.

Figure 2:
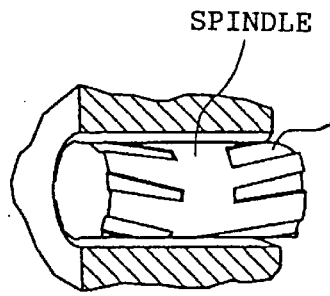
FIG. 2(a) and 2(b) are explanatory views showing an example of dynamic-pressure grooves formed on a radial dynamic-pressure gap definition surface and an example of dynamic-pressure grooves formed on a thrust dynamic-pressure gap definition surface.
Figure 2:
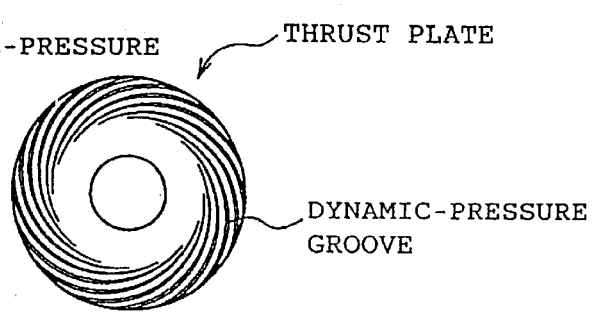

The thus-obtained granulation material powders were die-pressed into green compacts of the members, followed by firing at various temperatures shown in Table 1. The obtained sintered bodies were machined in the following manner. The inner circumferential surface and the opposite end faces of the bearing member 15 which will become the dynamic-pressure gap definition surfaces, the outer circumferential surface of the spindle 14, and the faces of the thrust plates 21 and 23 which will face the bearing member 15 were polished using a grinding diamond wheel having an abrasive No. of #100–#200 and were then lapped using a diamond abrasive #6000. Further, a relevant dynamic-pressure gap definition surface was subjected to sandblasting while an unnecessary region on the surface was masked, thereby forming dynamic-pressure grooves as shown in FIG. 2.

A polished region of each dynamic-pressure gap definition surface, in which region dynamic-pressure grooves are not formed, was observed through an optical microscope. An image obtained through observation was analyzed by known methods for an average size (an average grain diameter) of alumina crystal grains and an area percentage of alumina crystal grains having a size of 2–5 μm. Surface pores were measured for an average size, the maximum size, and an area percentage of pores having a size of 2–20 μm. The members were measured for density by an Archimedean method and were calculated for relative density by use of the measured density and true density estimated from the compositional ratios of alumina and the sintering aid.

Next, the above-mentioned members were incorporated into a motor having a dynamic-pressure bearing as shown in FIG. 3. The motor was subjected to the following tests.

(1) During continuous rotation at a rotational speed of 30,000 rpm, the runout of the bearing member 15 serving as a rotation portion (the maximum deflection of a measurement position on the outer circumferential surface of the bearing member 15 along a direction perpendicular to the axis of rotation) was measured using a laser interference length-measuring machine. Evaluation criteria were as follows: runout less than 0.1 μm: excellent (◎);

not less than 0.1 μm and less than 0.2 μm: good (○); not less than 0.2 μm and less than 0.3 μm: acceptable (Δ); in excess of 0.3 μm: not acceptable (X).

(2) The motor was subjected to 100,000 test cycles, each being such that the motor was accelerated from a stop state to a rotational speed of 30,000 rpm and held at that speed for 1 minute, and then the motor was stopped. Evaluation criteria for adhesion wear were as follows: adhesion wear was not observed with the dynamic-pressure gap definition surfaces until the test operation was completed: excellent (◎); adhesion wear was observed slightly when the test operation was completed: good (○); adhesion wear was observed in some degree when the test operation was completed, but no problem arose: acceptable (Δ); significant adhesion wear occurred in the course of the test operation and disabled the test: not acceptable (X). In the test for linking, motor torque was estimated from current applied to the motor. Evaluation criteria for linking was as follows: an unusual startup torque considered to be caused by linking was not observed until the test operation was completed: excellent (◎); a torque increase considered to be caused by linking was less than 10% based on an average startup torque of the motor which was evaluated as "excellent": good (○); a torque increase of not less than 10% and less than 50% was observed, but rotation was not disabled: acceptable (Δ); startup was frequently disabled due to a torque increase of not less than 50%: not acceptable (X). Further, the thrust dynamic-pressure gap definition surfaces of bearing members were measured for Rockwell hardness at a load of 15 N according to the method specified in JIS Z2245 (1992).

Also, bending test pieces were cut from the members and were measured for 3-point bending strength by the method specified in JIS R1601 (1981).

The test results are shown in Tables 1 and 2.

changes be included within the spirit and scope of the claims appended hereto.

This application is based on Japanese Patent Application No. 2001-035484 filed Feb. 13, 2001, the disclosure of which is incorporated herein by reference in its entirety.

What is claimed is:

1. A ceramic dynamic-pressure bearing having a dynamic-pressure gap formed between a first member and a second member, which first and second members undergo relative rotation about a predetermined axis of rotation to generate fluid dynamic-pressure in the dynamic-pressure gap, at least a portion of one or both of the first member and the second member including a dynamic-pressure gap definition surface

TABLE 1

|  | Average particle size of alumina powder (μm) | Alumina content (% by mass) | Density of sintered body (g/cm³) | Relative density of sintered body (%) | Average crystal grain size of sintered body (μm) | Area percentage of grains of 2–5 μm (%) | Sintering temp. (° C.) | Sintering time (hr) |
|---|---|---|---|---|---|---|---|---|
| 1* | 0.65 | 99.8 | 3.95 | 99 | 1.2 | 30 | 1670 | 5 |
| 2 | 0.65 | 99.5 | 3.90 | 98 | 1.0 | 42 | 1650 | 4 |
| 3 | 1.48 | 97.0 | 3.85 | 96 | 2.0 | 49 | 1650 | 4 |
| 4 | 2.01 | 95.0 | 3.72 | 93 | 3.0 | 55 | 1630 | 4 |
| 5 | 3.26 | 92.0 | 3.60 | 90 | 7.0 | 61 | 1590 | 2.5 |
| 6 | 3.26 | 90.0 | 3.59 | 90 | 7.0 | 41 | 1570 | 2.5 |
| 7* | 4.00 | 85.0 | 3.30 | 83 | 10.0 | 36 | 1500 | 5 |
| 8 | 0.65 | 99.5 | 3.89 | 98 | 1.0 | 39 | 1630 | 5 |
| 9 | 1.48 | 97.0 | 3.84 | 96 | 2.0 | 45 | 1630 | 5 |
| 10 | 3.26 | 92.0 | 3.58 | 89 | 4.5 | 57 | 1570 | 2.5 |
| 11 | 3.26 | 90.0 | 3.57 | 89 | 6.0 | 39 | 1550 | 2.5 |
| 12 | 3.26 | 90.0 | 3.57 | 89 | 7.0 | 39 | 1560 | 5 |
| 13* | 4.00 | 85.0 | 3.28 | 82 | 9.0 | 38 | 1500 | 4 |
| 14* | 4.00 | 85.0 | 3.40 | 85 | 11.0 | 36 | 1530 | 5 |

Samples marked with * fall outside the scope of the invention.

TABLE 2

|  | Average size of surface pores (μm) | Maximum size of surface pores (μm) | Area percentage of surface pores of 2–20 μm (%) | Runout | Linking | Adhesion wear | Bending strength (Mpa) | Rockwell hardness |
|---|---|---|---|---|---|---|---|---|
| 1* | 1.9 | 12 | 26 | X | X | X | 570 | 99 |
| 2 | 2.0 | 20 | 24 | ○ | ○ | ○ | 550 | 97 |
| 3 | 5.0 | 35 | 23 | ⊙ | ⊙ | ○ | 450 | 97 |
| 4 | 10.0 | 50 | 21 | ⊙ | ⊙ | ⊙ | 350 | 95 |
| 5 | 15.0 | 50 | 30 | ⊙ | ⊙ | ⊙ | 320 | 95 |
| 6 | 20.0 | 80 | 36 | ○ | ⊙ | ○ | 320 | 94 |
| 7* | 25.0 | 100 | 57 | X | ⊙ | ○ | 250 | 91 |
| 8 | 2.0 | 10 | 10 | Δ | Δ | Δ | 400 | 96 |
| 9 | 17.3 | 30 | 15 | ○ | ○ | ⊙ | 370 | 95 |
| 10 | 15.2 | 50 | 20 | ⊙ | ⊙ | ⊙ | 340 | 95 |
| 11 | 16.5 | 80 | 40 | ⊙ | ⊙ | ⊙ | 320 | 94 |
| 12 | 17.5 | 90 | 58 | ○ | ⊙ | ○ | 320 | 94 |
| 13* | 22.4 | 100 | 65 | X | ⊙ | Δ | 250 | 91 |
| 14* | 23.1 | 120 | 60 | X | ⊙ | X | 240 | 91 |

Samples marked with * fall outside the scope of the invention.

As seen from the above test results, by imparting an apparent density of 3.5–3.9 g/cm³ to alumina ceramic, the alumina ceramic exhibits enhanced bending strength and hardness and good durability to wear. Further, the average size of surface pores can be adjusted to a favorable range of 2–20 μm. As a result, a dynamic-pressure bearing can be realized which exhibits little rotation runout and is not prone to linking or seize-up. This effect is enhanced by adjusting the area percentage of pores having a size of 2–20 μm to 10–60%, preferably 20–50%.

It should further be apparent to those skilled in the art that various changes in form and detail of the invention as shown and described above may be made. It is intended that such formed of alumina ceramic and comprising a polished surface facing the dynamic-pressure gap, and the alumina ceramic, which forms the dynamic-pressure gap definition surface finished by polishing, has an apparent density of 3.5–3.9 g/cm³.

2. The ceramic dynamic-pressure bearing as claimed in claim 1, wherein the alumina ceramic has a relative density of 90–98%.

3. The ceramic dynamic-pressure bearing as claimed in claim 2, wherein the alumina ceramic has a bending strength of 280–550 MPa.

4. The ceramic dynamic-pressure bearing as claimed in claim 1, wherein the alumina ceramic has a bending strength of 280–550 MPa.

5. The ceramic dynamic-pressure bearing as claimed in claim 1, wherein the dynamic-pressure gap definition surface of alumina ceramic has a Rockwell hardness of 92–98 measured at a load of 15 N.

6. The ceramic dynamic-pressure bearing as claimed in claim 1, wherein the dynamic-pressure gap definition surface finished by polishing is formed of ceramic crystal grains having an average grain size of 1–7 μm.

7. The ceramic dynamic-pressure bearing as claimed in claim 1, comprising ceramic crystal grains formed on the dynamic-pressure gap definition surface, wherein ceramic crystal grains having a grain size of 2–5 μm occupy an area percentage of not less than 40%.

8. The ceramic dynamic-pressure bearing as claimed in claim 7, wherein the dynamic-pressure gap definition surface comprises surface pores having an average size greater than the average grain size of the ceramic crystal grains.

9. The ceramic dynamic-pressure bearing as claimed in claim 8, wherein the surface pores present on the dynamic-pressure gap definition surface have an average size of 2–20 μm.

10. The ceramic dynamic-pressure bearing as claimed in claim 9, wherein surface pores on the dynamic-pressure gap definition surface having a size of 2–20 μm occupy an area percentage of 15–60%.

11. The ceramic dynamic-pressure bearing as claimed in claim 1, wherein the first member and the second member are entirely formed of ceramic; the ceramic is a dense ceramic sintered body having a relative density of not less than 90%; said sintered body containing pores having a size of 2–20 μm; and said pores are localized mainly on the dynamic-pressure gap definition surface in the form of surface pores.

12. The ceramic dynamic-pressure bearing as claimed in claim 11, wherein the surface pores are formed as a result of ceramic crystal grains dropping off in the course of finishing the dynamic-pressure gap definition surface.

13. The ceramic dynamic-pressure bearing as claimed in claim 1, wherein the first member is formed into a spindle and is inserted into a reception hole formed in the second member; and an inner surface of the reception hole and an outer circumferential surface of the first member to be received inside the inner surface serve as radial dynamic-pressure gap definition surfaces, which define a radial dynamic-pressure gap therebetween.

14. The ceramic dynamic-pressure bearing as claimed in claim 1, wherein the first member faces at least one end face of the second member with respect to the axis of rotation; and the end face of the second member and a face of the first member facing the end face serve as thrust dynamic-pressure gap definition surfaces, which define a thrust dynamic-pressure gap therebetween.

15. The ceramic dynamic-pressure bearing as claimed in claim 1, comprising dynamic-pressure grooves formed on the dynamic-pressure gap definition surface.

16. The ceramic dynamic-pressure bearing as claimed in claim 1, adapted for use as a bearing for a spindle for rotating a hard disk of a hard disk drive.

17. The ceramic dynamic-pressure bearing as claimed in claim 1, adapted for use as a bearing for a spindle for rotating a polygon mirror of a polygon scanner.

18. A motor comprising the ceramic dynamic-pressure bearing as claimed in claim 1, said bearing serving as a rotary output member of the motor.

19. A motor as claimed in claim 18, adapted for use in a drive unit for rotating a hard disk of a hard disk drive.

20. The motor as claimed in claim 18, adapted for use in a polygon mirror drive unit of a polygon scanner.

21. The motor as claimed in claim 18, adapted for high-speed rotation at a maximum rotational speed of not less than 8000 rpm.

22. A hard disk drive comprising the motor as claimed in claim 18 and a hard disk rotated by the motor.

23. A polygon scanner comprising the motor as claimed in claim 18 and a hard disk rotated by the motor.

* * * * *